(12) United States Patent
Kawabe et al.

(10) Patent No.: US 6,201,371 B1
(45) Date of Patent: Mar. 13, 2001

(54) UNINTERRUPTIBLE POWER SYSTEM

(75) Inventors: Toshiyuki Kawabe; Tatsuhiko Satoh, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/509,948

(22) PCT Filed: Aug. 2, 1999

(86) PCT No.: PCT/JP99/04177

§ 371 Date: Jun. 15, 2000

§ 102(e) Date: Jun. 15, 2000

(87) PCT Pub. No.: WO00/08735

PCT Pub. Date: Feb. 17, 2000

(30) Foreign Application Priority Data

Aug. 7, 1998 (JP) .................................................. 10-223939

(51) Int. Cl.[7] .................................................. H01M 10/46
(52) U.S. Cl. .................................................. 320/121; 307/66
(58) Field of Search .................................. 320/103, 106, 320/110, 116, 117, 121, 128, 134, 136, 140; 327/66

(56) References Cited

FOREIGN PATENT DOCUMENTS

| | | |
|---|---|---|
| 63-091177 | 1/1990 | (JP) . |
| 7-170678 | 7/1995 | (JP) . |
| 7-245886 | 9/1995 | (JP) . |
| 8-154347 | 6/1996 | (JP) . |
| 8-154349 | 6/1996 | (JP) . |

*Primary Examiner*—Edward H. Tso
(74) *Attorney, Agent, or Firm*—McDermott, Will & Emery

(57) ABSTRACT

Almost no consideration has heretofore been given to power saving of an uninterruptible power supply apparatus (UPS) and to power saving of a total system including power saving of the load apparatus connected to the UPS and the devices attached to the load apparatus thus wasting electric power and indicating need for improvement. To address these issues, the present invention comprises power supply input means 1 for supplying commercial power to the UPS, an AC-to-DC converter 4, a rechargeable battery 6, a charging circuit 5, a DC-to-AC inverter 8, and a control circuit 9 for performing various control of the UPS, and further comprises a power supply circuit 3 for transferring an output from the power supply input means 1 to the control circuit 9, a switch "a" 2 connected to the power supply input means 1, and a switch "b" 12 for changing the route of supplying power, so as to achieve power saving of the UPS by optimally controlling the switches "a" and "b" at optimum positions in each respective system.

12 Claims, 1 Drawing Sheet

UNINTERRUPTIBLE POWER SYSTEM

FIELD OF THE INVENTION

The present invention relates to an uninterruptible power supply apparatus, in particular to an uninterruptible power supply apparatus in which power consumption of the apparatus, load apparatus, and peripheral devices can be reduced in accordance with the operating conditions of the load apparatus such as a computer and the like connected to the uninterruptible power supply apparatus.

BACKGROUND OF THE TECHNOLOGY

As uninterruptible power supply apparatuses, an apparatus called continuous commercial power feeding system has hereto been employed. In this system, in normal operation, the input power is directly supplied to a load while charging a battery through a charging circuit; and, in the event of a power failure, power is supplied from the battery by mechanically switching a relay from commercial power supply to an inverter circuit. Although this system has an advantage of a low cost and a low loss because the specification has now become standard, it suffered problems of being susceptible to the fluctuation of the commercial power supply as the input power is directly supplied to the load and also being difficult to make it smaller and lighter because a large size transformer is required. It also suffers added disadvantage of requiring a switching time in the event of a power failure for mechanically switching a relay to obtain power from the battery. For instance, when a computer is used as a load apparatus, fluctuation of the power supply voltage or suspension of power supply during the period of switching may cause malfunction of the computer, leaving room for improvement.

There was available a continuous commercial power feeding system with auto voltage regulation function in which the continuous commercial power feeding system had been improved by the use of a voltage step-up/step-down circuit to cope with a fluctuation of the commercial power. With this system, it was possible to maintain the supply voltage to the load within a predetermined range by stepping up the output voltage when the supply voltage had dropped and stepping down the output voltage when the supply voltage had increased. This way, it became possible to supply a stable voltage to the load when compared with the aforementioned system; for example the output voltage range could be maintained at 100+/−10 V for an AC input voltage of 100 V. However, in this system, too, perfectly stable supply of voltage to the load was not possible because of the time required for switching for voltage step-up or step-down. Also, there was a risk of accelerating deterioration of the battery due to battery backed-up operation for several seconds during switching for voltage step-up or step-down. Furthermore, problems of difficulty for smaller size and lighter weight design remained to be solved.

As another system other than the continuous commercial power feeding system, a continuous inverter power feeding system has been in actual use. In this system, in the normal condition, power is supplied to a load apparatus by first converting commercial power supply into a DC power followed by reconverting it back to an AC power by an inverter circuit while at the same time charging a battery with a charging circuit. In the event of a power failure, power is supplied to the load apparatus by operating the inverter circuit using the battery as the power supply. In this system, as power is supplied via an inverter circuit, it is always possible to supply a nearly constant voltage within a range of +/−3% to the load even when there is a fluctuation in the commercial power supply. Also, as there is no mechanical switching circuit, it is possible to supply power to the load apparatus without instantaneous interruption even in the event of a power failure. Furthermore, as a large size transformer is not required, it does not suffer the problems of the above-described continuous commercial power feeding system.

However, from the standpoint of power saving, the continuous inverter power feeding system in which an internal circuit was in constant operation consumed more power and was clearly inferior to the two earlier described types of continuous commercial power feeding system.

As an uninterruptible power supply apparatus has been designed and developed with a view to protecting supply of power to connected load apparatus such as a computer and the like, there has only been a notion of improving efficiencies of the AC-to-DC converter or DC-to-AC inverter from the power saving standpoint of the main unit of an uninterruptible power supply apparatus of the continuous inverter power feeding type. As one of the approaches toward this, there has been proposed a power-saving type uninterruptible power supply apparatus in which the voltage at which the efficiency of the load apparatus is the highest and the power dissipation is the lowest is judged by varying the inverter voltage within the allowable input voltage range of the load apparatus, and the inverter output voltage is fixed at the judged voltage during operation.

However, in the conventional uninterruptible power supply apparatus of the continuous inverter power feeding type, almost no consideration has been made on the power saving of the uninterruptible power supply apparatus as a whole or, further, power saving of the total system including the connected load apparatus such as a computer and peripheral devices connected to the load apparatus such as a printer, display, and the like. For this reason, power has been wasted when viewed as a total system, presenting problems to be improved.

The present invention addresses these problems and aims at achieving power saving of an uninterruptible power supply apparatus of the continuous inverter power feeding type as a whole as well as power saving of the total system including the uninterruptible power supply apparatus and connected load apparatus such as a computer and peripheral devices attached to the load apparatus.

SUMMARY OF THE INVENTION

In order to achieve the above objective, the uninterruptible power supply apparatus of the present invention provides an uninterruptible power supply apparatus of continuous inverter power feeding type comprising power supply input means for supplying commercial power to the apparatus, an AC-to-DC converter for converting an AC output of the power supply input means into a DC output, a built-in rechargeable battery, a charging circuit for charging the rechargeable battery, a DC-to-AC inverter for converting the DC output from the AC-to-DC converter or from the rechargeable battery, and a control circuit for performing various control of the apparatus, in which normal supply of power to a connected load apparatus in the event of a power failure can be maintained by supplying power from the rechargeable battery. The uninterruptible power supply apparatus further comprises a power supply circuit for transferring an AC output from the power supply input means to the control circuit, a switch "a" connected to the power supply input means, a switch "b" for changing the route of supplying power, and a load current detecting circuit for measuring the current flowing in the load apparatus so that the control circuit switches the switch "a" and switch "b" depending on the output from the load current detecting circuit.

In this configuration, when the value of a current detected by the load current detecting circuit has become equal to or lower than a predetermined value, the switch "a" is opened so that the power supply input means and the switch "b" are directly connected thereby suspending the supply of power to the uninterruptible power supply apparatus main circuit consisting of the AC-to-DC converter, the rechargeable battery, the charging circuit, and the DC-to-AC inverter. When the value of a current detected by the load current detecting circuit has become equal to or higher than a predetermined value, supply of power to the uninterruptible power supply apparatus main circuit can be resumed thereby allowing power saving of not only the apparatus alone but also of the total system when compared with the conventional uninterruptible power supply apparatus of continuous inverter power feeding type.

Also, the present invention provides an uninterruptible power supply apparatus of continuous inverter power feeding type comprising power supply input means for supplying commercial power to the apparatus, an AC-to-DC converter for converting the AC output of the power supply input means into a DC output, a built-in rechargeable battery, a charging circuit for charging the rechargeable battery, a DC-to-AC inverter for converting the DC output from the AC-to-DC converter or from the rechargeable battery, and a control circuit for performing various control of the apparatus, in which normal supply of power to a connected load apparatus is maintained in the event of a power failure by supplying power from the rechargeable battery, and in which setting of time of operation is possible. The uninterruptible power supply apparatus further comprises a power supply circuit for transferring an AC output from the power supply input means to the control circuit, a switch "a" connected to the power supply input means, and a switch "b" for changing the route of supplying power, and the control circuit opens the switches "a" and "b" when outside of the operating time.

In this configuration, it is possible to completely suspend supply of power to the main circuit of the uninterruptible power supply apparatus when outside of the operating time, and when the value of a current detected by the load current detecting circuit has become equal to or smaller than a predetermined value, the switch "a" is opened so that the power supply input means and the switch "b" are directly connected thereby suspending supply of power to the main circuit of the uninterruptible power supply apparatus consisting of the AC-to-DC converter, rechargeable battery, charging circuit, and DC-to-AC inverter; and when the value of a current detected by the load current detecting circuit has become equal to or greater than a predetermined value, the supply of power to the main circuit of the uninterruptible power supply apparatus can be resumed. This way, power saving of not only the apparatus alone but also the total system can be further achieved when compared with a conventional uninterruptible power supply apparatus of continuous inverter power feeding type.

Furthermore, the present invention provides an uninterrupitble power supply apparatus of continuous inverter power feeding type comprising power supply input means for supplying commercial power to the apparatus, an AC-to-DC converter for converting an AC output of the power supply input means into a DC output, a built-in rechargeable battery, a charging circuit for charging the rechargeable battery, a DC-to-AC inverter for converting the DC output from the AC-to-DC converter or from the rechargeable battery, and a control circuit for performing various control of the apparatus,. in which normal supply of power to a connected load apparatus is maintained in the event of a power failure by supplying power from the rechargeable battery, and in which the control circuit is provided with a control output terminal for controlling supply of power to peripheral devices attached to the load apparatus in synchronism with the state of supply of power to the load apparatus.

In this configuration, when the load apparatus such as a computer the power supply to which is protected by the uninterruptible power supply apparatus is either in a power saving mode (a state in which the power supply input means and the load apparatus are directly connected through the switch "b") or in a mode in which the supply of power to the load apparatus is suspended by opening the switch "b", the supply of power to the peripheral devices attached to the load apparatus such as a printer and display can be suspended thereby allowing further power saving of the total system.

DESCRIPTION OF THE PREFERRED EMBODIMENTS

Figure 1:
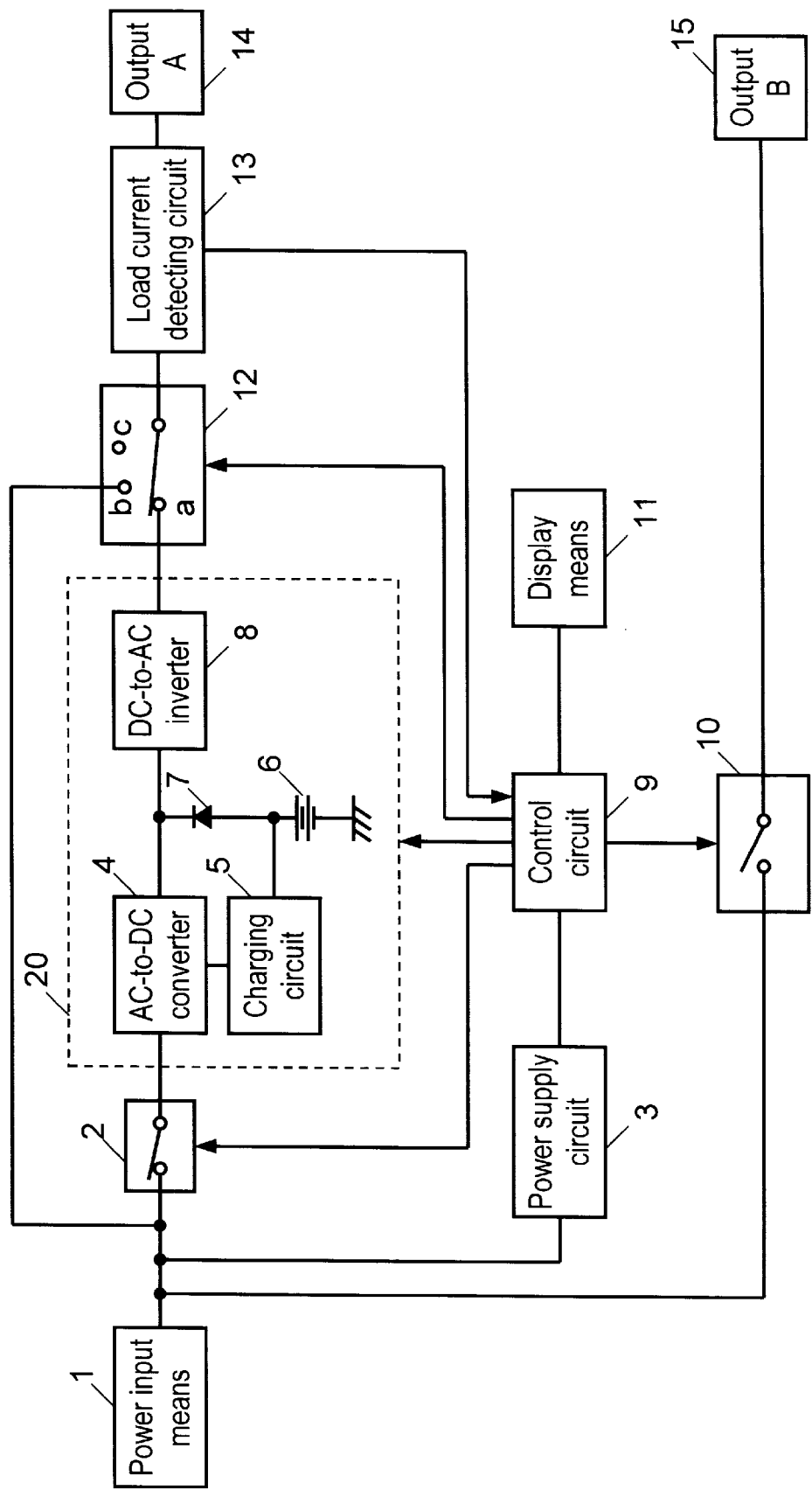
FIG. 1 is a block diagram of the uninterruptible power supply apparatus of the present invention.

Referring to FIG. 1, a description of exemplary embodiments of the present invention will be given in the following.
Exemplary Embodiment—1

An AC input (for example, 100 V in Japan and the United States, 220 V in Europe) is made through a power supply input means 1 and is fed to a power supply circuit 3. The power supply circuit 3 is connected to the power supply input means 1 without going through a switch "a" 2 and supplies power to a control circuit 9 independently of the operating mode of the uninterruptible power supply apparatus. Also, in the normal operation of the uninterruptible power supply apparatus, the switch "a" 2 is closed and a switch "b" 12 is connected to a contact "a". Consequently, the AC voltage supplied through the power supply input means 1 is converted into a DC voltage by an AC-to-DC converter 4 and is further converted back into an AC voltage by a DC-to-AC inverter 8, and is put out from an output A 14 to a load apparatus such as a computer through a load current detecting circuit 13. On the other hand, the input through the switch "a" 2 charges a rechargeable battery 6 after further passing through the AC-to-DC converter 4 and a charging circuit 5. The block enclosed with dotted lines works in the present invention as an uninterruptible power supply apparatus main circuit 20. Even in the event of no input of commercial power due to a power failure and the like, electricity stored in the rechargeable battery 6 is fed to the DC-to-AC inverter 8 through a reverse current prevention diode 7 thus maintaining a constant output from the output A 14 to the load apparatus such as a computer. Obtaining an output from the control circuit 9, display means 11 displays status of deterioration of the rechargeable battery 6 and which of an AC input and the rechargeable battery 6 is the source of the output to the load apparatus.

In the present invention, the current flowing in a load apparatus connected to the output A 14 is constantly measured by the load current detecting circuit 13. When the current has become smaller than a predetermined value, the switch "a" 2 is opened by an output from the control circuit 9, the switch "b" 12 is switched over to contact "b", thereby suspending supply of power to the uninterruptible power supply apparatus main circuit 20 while connecting the power supply input means 1 directly to the load apparatus through the load current detecting circuit 13 and the output A 14. The load current detecting circuit 13 is so designed that its sensitivity can be changed from the side of the load apparatus depending on the type of the load apparatus. Also, when the value measured by the load current detecting circuit 13 has exceeded a predetermined value, the switch "a" 2 is closed and the switch "b" 12 is returned to connection with the contact "a" thereby allowing normal operation of the uninterruptible power supply apparatus. In the present invention, although switches are provided in the input section and the output section of the uninterruptible power supply apparatus main circuit 20 (the section enclosed with dotted line in FIG. 1) in order to clearly turn on and of f the supply of power to the uninterruptible power supply apparatus main circuit 20, it is a matter of course that the present invention includes a configuration in which the circuit construction is not as clear as above described but a switch is arranged in a manner such that operation of a part of the circuit is suspended. In the meantime, when a power failure and the like takes place while the power supply input means 1 is in direct connection with a load apparatus through the load current detecting circuit 13 and the output A 14, supply of power to the control circuit 9 is also suspended. However, as an electrolytic capacitor for noise elimination is usually provided in the control circuit 9, the system may be configured in such a way that power is supplied to the load apparatus by utilizing the power stored in the capacitor to control the switch "a" 2 and switch "b" 12 and display the information on the display means 11.

When the power supply input means 1 is directly connected to a load apparatus, though the load apparatus is easily affected by the fluctuation of the commercial power supply, practically it hardly matters as the load apparatus is not generally in operation when directly connected in this way.

Exemplary Embodiment—2

A description of another exemplary embodiment will be given. As the basic configuration is the same as in Exemplary Embodiment—1, a description will be made only on the differences. The uninterruptible power supply apparatus of the present exemplary embodiment assumes a case where the time of use of a load apparatus is known in advance. In the use for factory automation, for example, as it is surely known that the load apparatus will not be in use on Saturdays and Sundays and for several hours on week days, power saving under such use has been taken into account. In the present exemplary embodiment, a load current detecting circuit 13 is not necessarily required; it is required only when the control as described in the Exemplary Embodiment—1 is to be concurrently performed.

In the control circuit 9, operating time of the uninterruptible power supply apparatus has been set in advance by the user. This corresponds to the non-used time of the load apparatus. In the control circuit 9, when the load apparatus is not in use, maximum saving of electric power is achieved by opening the switch "a" 2 and connecting the switch "b" 12 to a contact "c" (open state where no connection is made). Also, when to operate the load apparatus again, it is enough to return the switch "a" 2 and switch "b" 12 to positions of operation of the uninterruptible power supply apparatus main circuit 20 shortly before resumption of operation by taking into consideration the time required for the uninterruptible power supply apparatus main circuit 20 to become surely stable.

As an example, the degree of power saving for a 1 KVA type apparatus will be given. Conventionally, such apparatus consumed approximately 40 W in both loaded and unloaded operation. With the present improvement, a power consumption of approximately 40 W for loaded operation and 20 W for unloaded operation has been achieved. Assuming that the apparatus is not in operation for two whole days in every week and for 8 hours in the remaining 5 days, the total annual non-operating time is calculated to be:

104 days×24 hours+261 days×8 hours=4584 hours.

The amount of total annual reduction in the electric power consumption is calculated to be:

(40−20)$W$×4584 hours=91680 Wh.

As has been shown, a remarkable effect of power saving can be achieved by the present invention.

In the present exemplary embodiment, similarly to the Exemplary Embodiment—1, the circuit is so configured that the whole of the uninterruptible power supply apparatus main circuit 20 is turned on or off as illustrated in FIG. 1; however, it is a matter of course that it can be configured in a manner such that only the section consuming large power is turned off.

Exemplary Embodiment—3

A description of still another exemplary embodiment will be given. As the basic configuration is the same as in the Exemplary Embodiment—1, only differences will be described. This exemplary embodiment has functions equivalent to those of the Exemplary Embodiment—1 or Exemplary Embodiment—2, and provides either power saving mode when a load apparatus is not in operation (a state where power supply input means 1 and the load apparatus are directly connected through a switch "b") or a mode of suspension of power to the load apparatus where the switch "b" is open. For these modes, a control output terminal for suspending supply of power to peripheral devices in synchronization is provided from which terminal a switch "c" 10 can be controlled. In other words, when the uninterruptible power supply apparatus is in either of the above modes, the switch "c" 10 is opened, making it possible to suspend, by the control of the uninterruptible power supply apparatus, the supply of power to the peripheral devices (e.g., printer and display) which are separately powered as they are not required to be protected by the uninterruptible power supply apparatus against power abnormality. With this arrangement, power saving as a total system can be further achieved. Also, it provides an added effect of saving power by automatically turning off the power in the event one forgot to turn off the peripheral devices.

Among the devices, there are load apparatuses such as a computer, server and the like the power supply to which must be stable, and peripheral devices such as a printer, display, and the like attached to a load apparatus the power supply to which does not need to be relatively stable. With the present invention, it is possible to achieve power saving of a total system including these apparatuses and devices.

In the present invention, the waveforms generated by the DC-to-AC inverter are mainly sinusoidal waves and rectangular waves. When rectangular waves are used, the uninterruptible power supply apparatus can be used for computers, displays, hard disc drives, etc., which employ a switching power supply. When sinusoidal waves are used, there exists less limitation than with rectangular waves. There exists almost no limitation on the type of applicable load apparatuses, with the exception of some motors to which they are not applicable.

The applicable range of the uninterruptible power supply apparatus of the present invention is broad and covers not only power protection in the above described computer management and computer network management, but also in power protection of various systems such as building management including gate opening/closing, elevators, fire alarms, lighting, air conditioning; security control including monitoring camera, monitoring video, centralized control; factory automation including various machining centers, robots; financial systems including on-line systems, unattended money lending machines; POS systems for sales and inventory management at super markets; various management systems for business trips, cash handling, attendance management, personnel management, etc.; and ticket vending machines and ticket inspection machines, etc.

Industrial Application

As has been described above, the uninterruptible power supply apparatus in accordance with the present invention enjoys a superior effect of power saving of the total system including a load apparatus and the uninterruptible power supply apparatus by being able to choose an appropriate mode from the modes for normal operation of the uninturruptible power supply apparatus, power saving, and suspension of supply of power.

Furthermore, as a control output terminal for controlling supply of power to peripheral devices is provided in a control circuit, the uninterruptible power supply apparatus in accordance with the present invention has a superior effect of power saving of the total system including the uninterruptible power supply apparatus, the load apparatus connected to the uninterruptible power supply apparatus, and the peripheral devices attached to the load apparatus.

LIST OF REFERENCE NUMERALS

1. Power supply input means
2. Switch "a"
3. Power supply circuit
4. AC-to-DC converter
5. Charging circuit
6. Rechargeable battery
7. Diode
8. DC-to-AC inverter
9. Control circuit
10. Switch "c"
11. Display means
12. Switch "b"
13. Load current detecting circuit
14. Output A
15. Output B
20. Uninterruptible power supply apparatus main circuit

What is claimed is:

1. An uninterruptible power supply apparatus of continuous inverter power feeding type comprising:
   power supply input means for supplying commercial power to the apparatus;
   an AC-to-DC converter for converting an AC output of said power supply input means into a DC output;
   a built-in rechargeable battery;
   a charging circuit for charging said rechargeable battery;
   a DC-to-AC inverter for converting a DC output from said AC-to-DC converter or said rechargeable battery into an AC output; and
   a control circuit for performing various control of the apparatus;
   wherein normal supply of power to a connected load apparatus is maintained by supplying power from said rechargeable battery in the event of a power failure;
   the uninterruptible power supply apparatus further including:
   a power supply circuit for transferring an AC output from said power supply input means to said control circuit;
   a switch "a" connected to said power supply input means;
   a switch "b" for changing the route of supplying power; and
   a load current detecting circuit for measuring the value of a current flowing in the load apparatus;
   whereby said control circuit switches between said switch "a" and switch "b" depending on an output from said load current detecting circuit.

2. The uninterruptible power supply apparatus of claim 1, wherein the switch "a" is opened when the value of a current detected by said load current detecting circuit has become equal to or smaller than a predetermined value so that said power supply input means and said switch "b" are directly connected.

3. The uninterruptible power supply apparatus of claim 1, wherein supply of power to a main circuit of the uninterruptible power supply system comprising the AC-to-DC converter, the rechargeable battery, the charging circuit, and the DC-to-AC inverter is suspended when the value of a current detected by said load current detecting circuit has become equal to or smaller than a predetermined value.

4. The uninterruptible power supply apparatus of claim 1, wherein supply of power to a main circuit of the uninterruptible power supply apparatus is started when the value of a current detected by said load current detecting circuit has become equal to or greater than a predetermined value.

5. The uninterruptible power supply apparatus of claim 1, wherein said control circuit is provided with a control output terminal for making control in synchronism with an output from said control circuit to be supplied to said switch "a" and switch "b".

6. An uninterruptible power supply apparatus of continuous inverter power feeding type comprising:
   power supply input means for supplying commercial power to the apparatus;
   an AC-to-DC converter for converting an AC output of said power supply input means into a DC output;
   a built-in rechargeable battery;
   a charging circuit for charging said rechargeable battery;
   a DC-to-AC inverter for converting a DC output from said AC-to-DC converter or said rechargeable battery into an AC output; and
   a control circuit for performing various control of the apparatus;
   wherein normal supply of power to a connected load apparatus is maintained by supplying power from said rechargeable battery in the event of a power failure and wherein an operating time can be set;
   the uninterruptible power supply apparatus further including:
   a power supply circuit for transferring an AC output from said power supply input means to said control circuit;
   a switch "a" connected to said power supply input means; and
   a switch "b" for changing the route of supplying power; whereby said control circuit switches said switch "a" and switch "b" to open positions when outside of the operating time.

7. The uninterruptible power supply apparatus of claim 6, wherein said switch "b" connected to a load current detecting circuit is connected to a main circuit of the uninterruptible power supply apparatus comprising the AC-to-DC converter, the rechargeable battery, and the DC-to-AC inverter, or is directly connected to said power supply input means, or is opened.

8. The uninterruptible power supply apparatus of claim 6 including a load current detecting circuit for measuring the value of a current flowing in a load apparatus, wherein said switch "a" is opened so that said power supply input means and said switch "b" are directly connected when the value of a current detected by said load current detecting circuit has become equal to or smaller than a predetermined value.

9. The uninterruptible power supply apparatus of claim 6 including a load current detecting circuit for measuring the value of a current flowing in a load apparatus, wherein supply of power to a main circuit of the uninterruptible power supply apparatus comprising the AC-to-DC converter, the rechargeable battery, the charging circuit, and the DC-to-AC inverter is suspended when the value of a current detected by said load current detecting circuit has become equal to or smaller than a predetermined value.

10. The uninterruptible power supply apparatus of claim 6 including a load current detecting circuit for measuring the value of a current flowing in a load apparatus, wherein supply of power to a main circuit of the uninterruptible power supply apparatus comprising the AC-to-DC converter, the rechargeable battery, the charging circuit, and the DC-to-AC inverter is started when the value of a current detected by said load current detecting circuit has become equal to or greater than a predetermined value.

11. The uninterruptible power supply apparatus of claim 6, wherein said control circuit includes a control output terminal for controlling the devices in and out of the system in synchronism with an output from said control circuit to said switch "a" and switch "b".

12. An uninterruptible power supply apparatus of continuous inverter power feeding type comprising:

power supply input means for supplying commercial power to the apparatus;

an AC-to-DC converter for converting an AC output of said power supply input means into a DC output;

a built-in rechargeable battery;

a charging circuit for charging said rechargeable battery;

a DC-to-AC inverter for converting a DC output from said AC-to-DC converter or said rechargeable battery into an AC output; and a control circuit for performing various control of the apparatus;

wherein normal supply of power to a connected load apparatus is maintained by supplying power from said rechargeable battery in the event of a power failure, and said control circuit is provided with a control output terminal for controlling supply of power to peripheral devices attached to the load apparatus in synchronism with the state of supplying power to the load apparatus.

* * * * *